(12) United States Patent
Lantz

(10) Patent No.: US 6,805,365 B2
(45) Date of Patent: Oct. 19, 2004

(54) SHOPPING CART CONSTRUCTED OF RESIN AND METAL CHANNEL MEMBERS

(76) Inventor: Charles J. Lantz, 20272 SH2, Archbold, OH (US) 43502

(*) Notice: Subject to any disclaimer, the term of this patent is extended or adjusted under 35 U.S.C. 154(b) by 98 days.

(21) Appl. No.: 10/084,821

(22) Filed: Feb. 28, 2002

(65) Prior Publication Data
US 2003/0160407 A1 Aug. 28, 2003

(51) Int. Cl.[7] .............................................. B62B 3/00
(52) U.S. Cl. ............................. 280/33.991; 280/33.992
(58) Field of Search ...................... 280/33.991, 47.35, 280/33.995, 33.997, 33.992, 33.998, 47.19, 47.34, 33.993, 33.996, 638, 35; 40/590; 248/99; 220/486, 505

(56) References Cited

U.S. PATENT DOCUMENTS

| | | | | |
|---|---|---|---|---|
| 4,123,077 A | * | 10/1978 | Joseph | 280/47.34 |
| 4,632,411 A | * | 12/1986 | Badger | 280/33.991 |
| 4,946,059 A | * | 8/1990 | Rehrig | 220/643 |
| 5,255,930 A | * | 10/1993 | Jones et al. | 280/33.992 |
| 5,289,936 A | * | 3/1994 | Jones et al. | 220/4.28 |
| 5,441,288 A | * | 8/1995 | Rehrig | 280/33.991 |
| 5,791,666 A | * | 8/1998 | Mainard | 280/33.991 |
| 5,865,448 A | * | 2/1999 | Kern et al. | 280/33.992 |
| 5,915,704 A | * | 6/1999 | Segura de Luna | 280/33.991 |
| 5,947,313 A | * | 9/1999 | Kern et al. | 220/4.01 |
| 6,488,292 B2 | * | 12/2002 | O'Quin | 280/33.991 |
| 6,540,240 B2 | * | 4/2003 | Nadeau et al. | 280/33.993 |
| 6,589,458 B2 | * | 7/2003 | DeCost | 264/50 |

* cited by examiner

Primary Examiner—Brian L. Johnson
Assistant Examiner—J. Allen Shriver
(74) Attorney, Agent, or Firm—Charles F. Schroeder

(57) ABSTRACT

A shopping cart in which the carriage is made principally of rectangular U-shaped channels and the basket is made of resin which on its sides are reinforced by U-shaped channel members each extending angularly up from the carriage into merged relation in a matching groove provided in the interior surface of each side of the basket. Front wheels of the carriage are swivelably mounted on a vertical shaft having a resilient securing assembly to minimize tendencies toward wobble of the wheel.

11 Claims, 7 Drawing Sheets

SHOPPING CART CONSTRUCTED OF RESIN AND METAL CHANNEL MEMBERS

This invention is a shopping cart of the type frequently referred to as a supermarket cart which according to the invention is made of resin combined with and strengthened by U-shaped metal channel members.

PRIOR ART

Shopping carts used by customers in supermarkets, grocery stores and self-service merchandising stores to convey selected merchandise through the store to the cashiers, in their early stage of development were predominately made of metal, most frequently of steel metal tubing or rods. Such carts are still being made having a metal basket supported on a metal carriage on wheels, with the basket on a metal framework provided with a push handle at the rear of the carriage. Additionally an interiorally folded section is arranged for forward unfolding from the rear of the basket to provide a seat for a youngster or for convenient conveyance of small articles of merchandise. Such carts are usually constructed to be nestable by making their rear wall pivotable toward the basket interior about a pivot region under the handle. The basket portion of each cart can thus be pushed within the basket of an immediately forward cart to permit compact storage of a line of carts.

More recently carts of this type have been made with a basket substantially entirely of resin to reduce the damage experienced with metal from impact dents and rusting with age. To make carts entirely of resin requires use of considerable more material than earlier carts, causing such carts at times to be heavier and more bulky than metal shopping carts.

BRIEF DESCRIPTION OF THE INVENTION

The invention herein presented is a resin basket of resin such as polypropylene combined with a metal support and a working backing framework of channels having a rectangular U-shaped cross-section in which the amount of resin required for the desired strength can be reduced considerably, resulting in a much lighter weight than when the cart components are made principally of all of resin or all metal. With less resin, the cost of production of such carts can also be reduced.

The metal channels providing the basket support framework, for sake of corrosion protection and appearance are coated with electrostactically applied powder resin heated to a temperature for an encasing flow coating of the metal members with resin. The channel shape provides a selective directional strength to portions of the carriage greater than is possible with tubular members, especially in the direction of forward movement of the cart. In addition, channel sections from the support framework are arranged to extend upwardly into the sides of the basket region with the U-shape facing the resin into which groves are molded for snug receipt of the leg portions of the channel members. This imparts a reinforcement to the resin sides while the resin of each side acts as a matrix for receipt of a channel extension thereby imparting a smooth face to the interior surface of the basket where the combination occurs.

In view of the foregoing a principal object of the invention is to provide a combined metal and resin shopping cart in which the amount of resin required for the carriage function can be minimized with a corresponding reduction in weight of the cart as well as cost of construction.

A feature of the invention lies in the fact that it can be made lighter in weight than carts made principally of resin or principally of metal, which permits greater ease of maneuverability and reduction in possible damage.

Other features of the present invention compared to tubular steel carts are quieter operation with no metal rattle sounds, longer appearance of newness because of lack of exposure of metal to rust and improved styling possible with plastic molding into rounded contours.

The present cart will less likely cause damage by bumping into parked vehicles or store fixtures or articles carried in the basket because there are no metal edges to harshly engage such items.

Besides being less in weight than steel tubular framed carts, the present cart is corrosion resistant and can be molded to reduce impact damage as well as molded in colors to match store colors and decor.

Compared to all plastic carts the present cart can be constructed with greater overall strength, less weight and bulkiness, less nesting space, and greater storage space under the basket.

The terms "channel" and "U-shaped" channel or bar as used herein refer to a rectangular cross sectional longitudinal member having an elongated flat face side with a pair of relatively short legs extending right angularly away from the face at opposite edges of the member.

The channel is made of metal such as steel, aluminum, copper or any of a number of metal alloys. By way of example without intending to be limiting, the channel herein may be of steel approximately 1½" wide, ⅛" thick with ⅜" legs.

Still another feature of the invention is that by use of metal channels instead of metal tubes, a directional strength can be selectively designed into the basket support frame and into the sides of a cart where the reinforcement can provide the most advantage. In other words the U-shaped cross section of the channels can provide a greater strength directionally against bending in comparison to tubular members. Accordingly the support structure of the carriage and reenforcement of the basket sides can be imparted a strength in directions desired.

Other objects and features which are believed to be characteristic of my invention are set forth with particularity in the appended claims. My invention however, both in organization and manner of construction, together with further objects and features thereof, may be best understood with reference to the following description taken in connection with the accompanying drawings.

DETAILED DESCRIPTION

Figure 1:
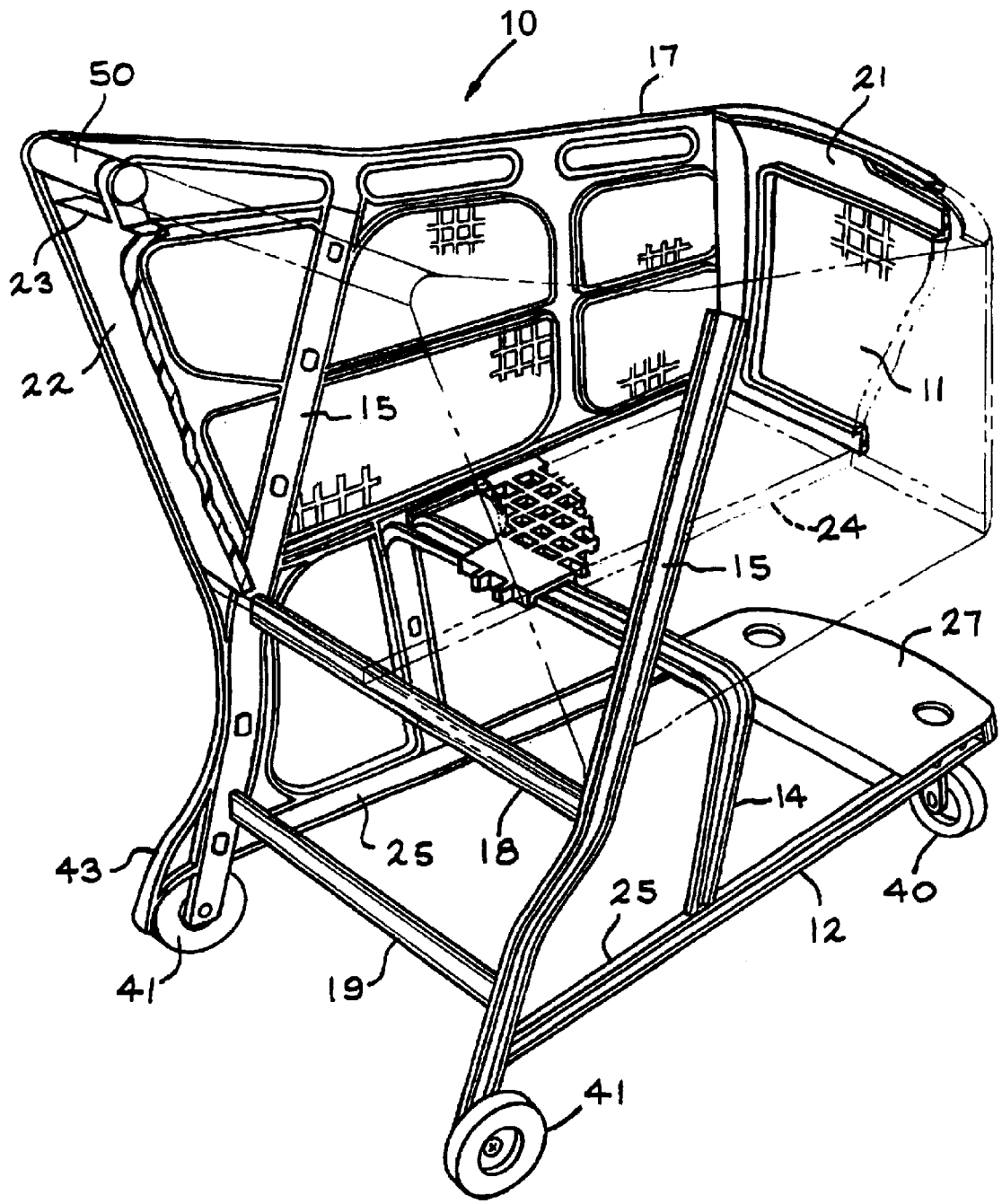
FIG. 1 is an overall broken away perspective, partially phantom view of the shopping cart of the present invention.
Figure 2:
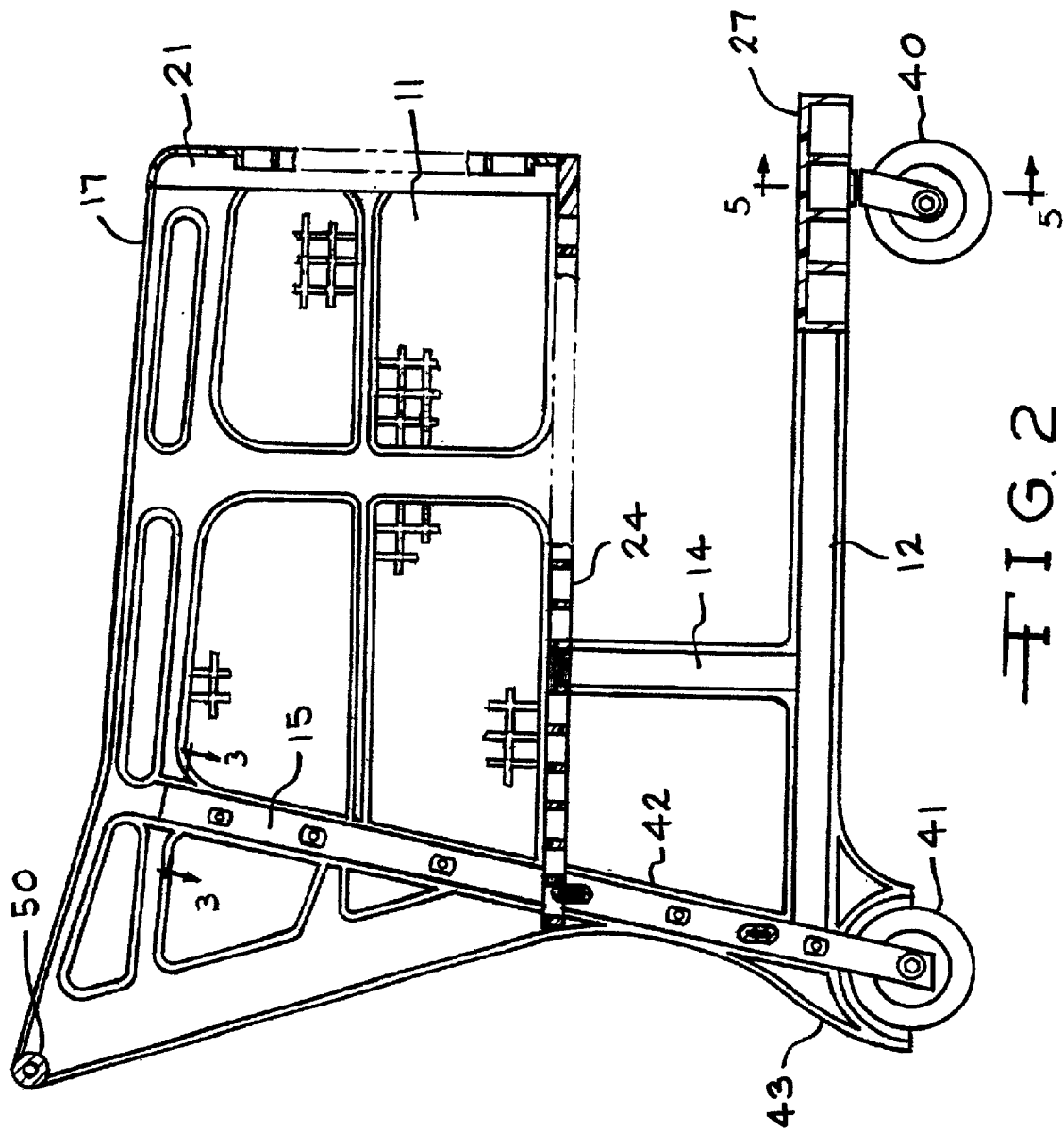
FIG. 2 is a side elevation, sectional view of the shopping cart of FIG. 1.

Turning to the drawings in greater detail, FIG. 1 illustrates a shopping cart 10 including in basket 11 on a wheeled carriage 12. A basket support bar 14 extends upwardly from one side of the carriage base 12 and over to the other side in bridging relation with both sides of the carriage to provide a support for the underside of the basket 11 in a region about one-third of the way between the rear and front portion of the basket.

A pair of side reinforcing bars 15 for the basket 11 extend upwardly from the rear end of the carriage base at a forward angle along side and in merged relation with the interior of the opposite sides 17 of the basket 11. The side reinforcing bars 15 extend upwardly to a level just below the top edge of the basket 11. Upper and lower cross-bracing bars 18 and 19, respectively extend between the two side reinforcing bars 15 holding them securely in stable spaced relation. A front end 21 of the basket 11 and its back rear end 22 join the two opposite sides 17 forming the basket. A bottom 24 of the basket is joined to the lower edges of both sides 17 as well as the bottom of the front end 21 and the back end 22 of the basket.

Figure 3:
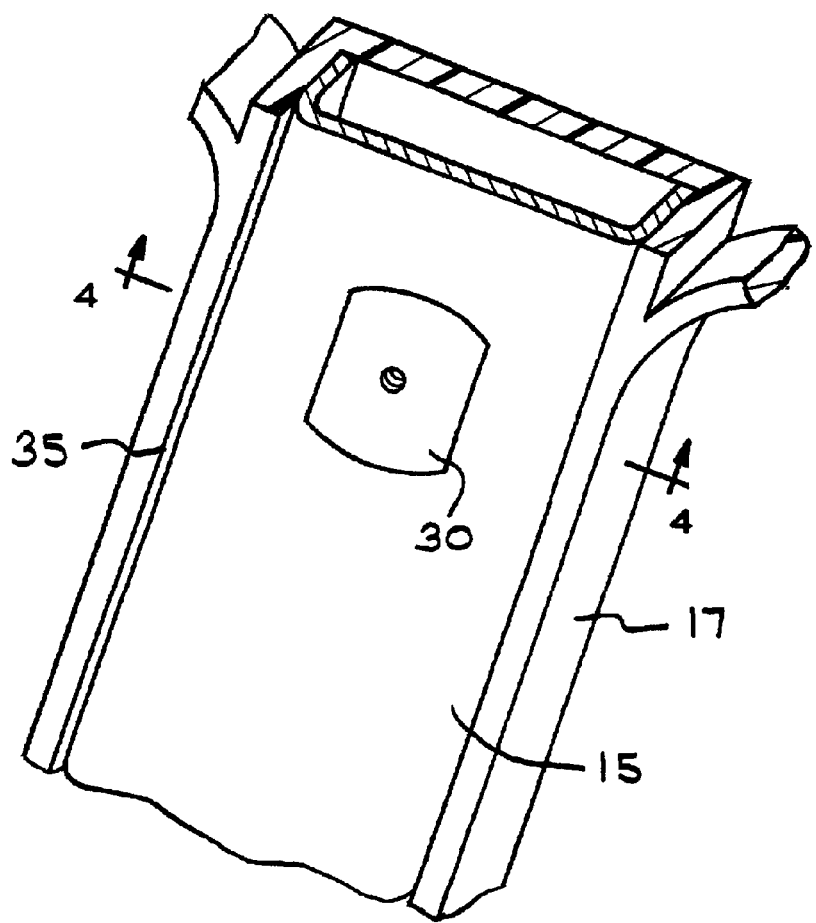
FIG. 3 is a cross-sectional view of a channel member assembled in combination with a side wall of the shopping cart of FIG. 1 as taken on line 3.3.

The interior faces of the basket 11 are formed with grooves 35 for receipt of a side reinforcing bar 15 as shown in FIG. 3. The grooves 35 are each arranged to receive in snug fit relation a U-shaped channel forming a side reinforcing bar 15 so that the exposed face of a side bar 15 is flush in non-projecting relation from the interior face of the resin side 17.

Figure 4:
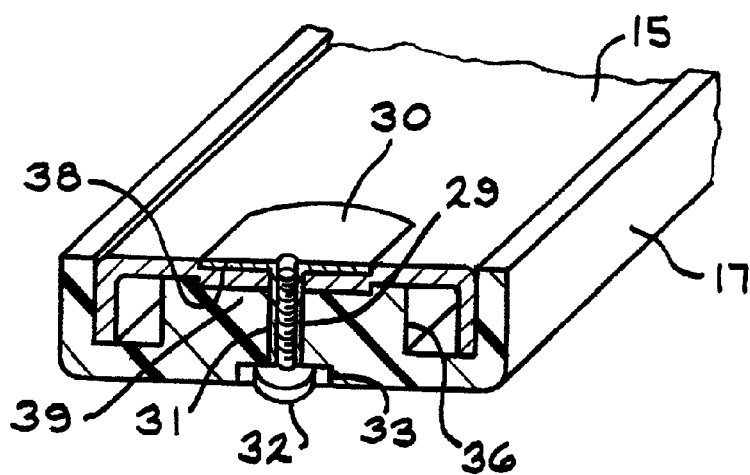
FIG. 4 is a cross-sectional view of the channel member of FIG. 3 as taken on line 4.4 of FIG. 3.

The two spaced side reinforcing bars 15 are joined to the interior of the opposite sides 17 of the basket with flat faced T-nuts spaced along the length of the reinforcing bars 15. As shown in FIG. 4, each T-nut has a hollow threaded shaft 29 extending through both the channel 15 and the resin side 17. Each nut receives a bolt 31 in threaded relation therewith extending from the exterior of a resin side of the basket for tight securement by a head 32 of the bolt set in a recess 33 formed in the exterior face of the resin side 17.

As shown in FIG. 4 where the T-nuts are located spaced from each other to hold each of the side bars 15 within a groove 35 of the side 17 of the basket, a recess 38 is stamped into the surface of the bar 15 to receive the flat head of the T-nut. A mating recess 39 on projection 36 is provided within the groove 35 against which the stamped interior projecting surface of the U-shaped channel bar 15 can be drawn in mated tightly secured relation without undue flexing of the bar by the threaded bolt 31.

The carriage 12 includes two spaced lower level U-shaped opposite channel members 25 extending substantially horizontally from the rear to the front of the cart 10. The ends of the basket support bar 14 are welded to the top edge of carriage space bars 25. The forward end of the bars 25 extend to and are secured by a pair of bolts 28 to the opposite sides of the front resin bumper 27. A pair of front wheels 40 are pivotally mounted as hereinafter described in spaced relation widthwise of the front bumper block 27, which permit easy steering of the cart. A pair of rear wheels 41 are mounted each on a fixed axis at the lower end of the side reinforcing bars 15.

The basket supporting cross bar channel 14 is arranged to have the legs of its U-shape channel facing the exterior of the cart. The horizontal portion, supporting the basket thus has its legs projecting upward for joinder with a groove formed in the bottom 24 of the basket. The cross bar 14 has each of its vertical arms covered by a vertical resin band extending downwardly from its overlying basket side 17.

The horizontal U-shaped channel bars 25 forming the sides of the basket or the carriage are arranged with their leg portions facing outwardly to be joined with and covered by plastic bands suspended from the vertical bands covering the vertical arms of the cross bar 14 as well as the hereinafter described arms 42, thereby to provide smooth interior and exterior surfaces for the carriage support members. The bracing bars 18 and 19 face the interior of the carriage to provide smooth exterior exposed surfaces.

Figure 5:
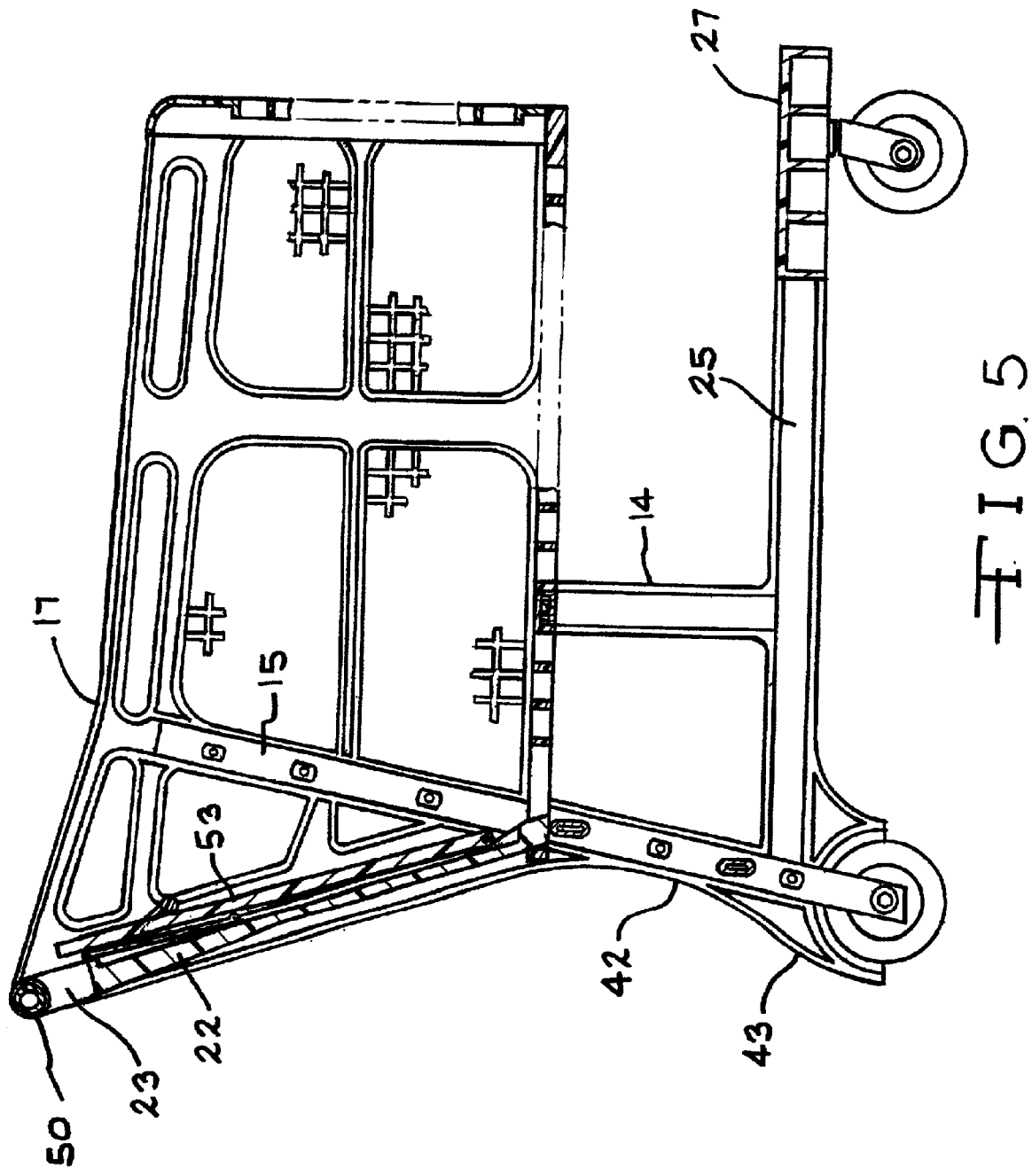
FIG. 5 is a side elevation cross-sectional view of the shopping care of FIG. 1 illustrating a child seat in folded relation with the pivotable basket backs of the cart.
Figure 6:
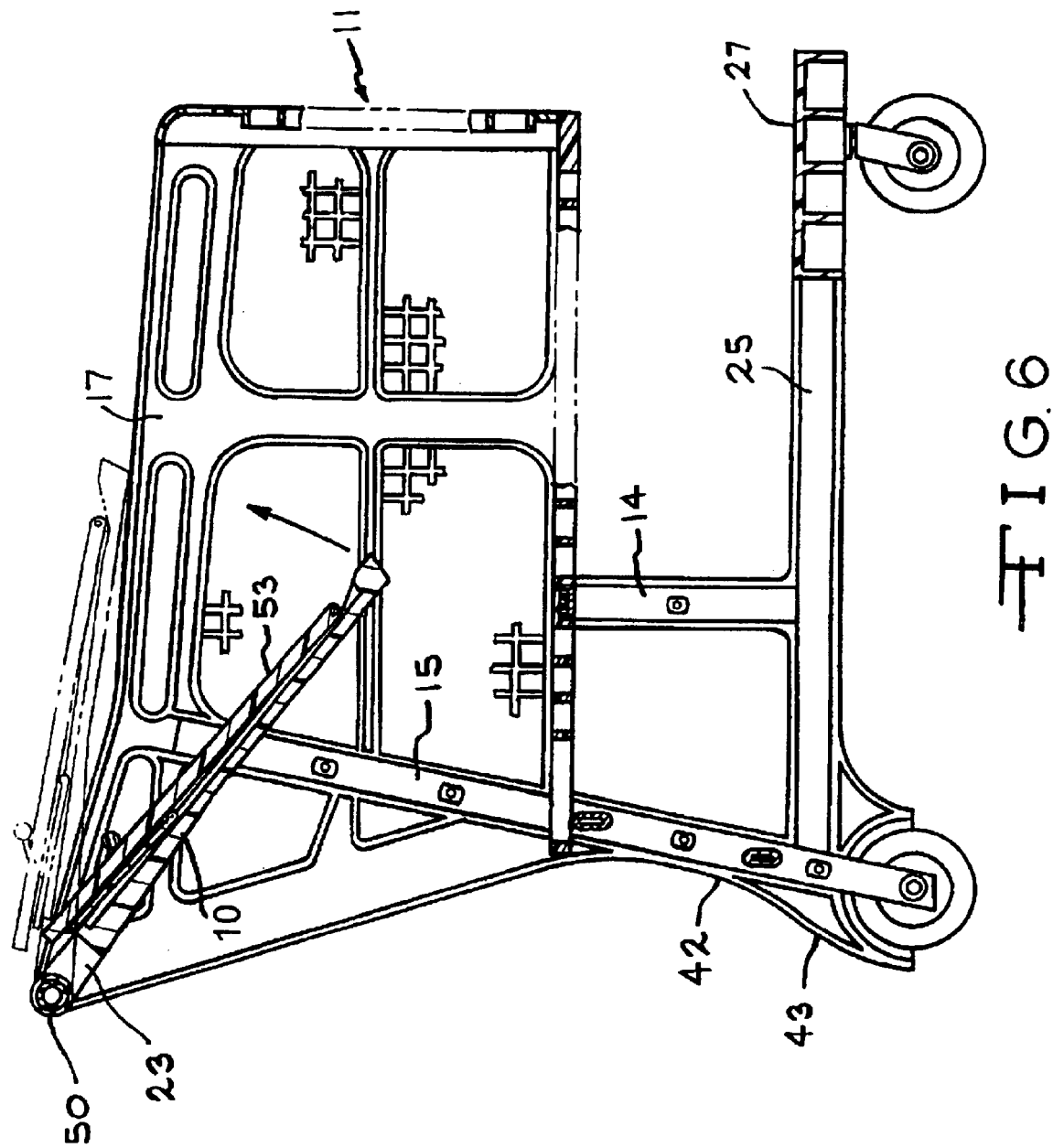
FIG. 6 illustrates the manner in which the back of the basket of FIG. 5 can be swung upward within the basket interior and in dotted lines illustrates the level to which it can be swung when a following cart basket is nested therein.
Figure 7:
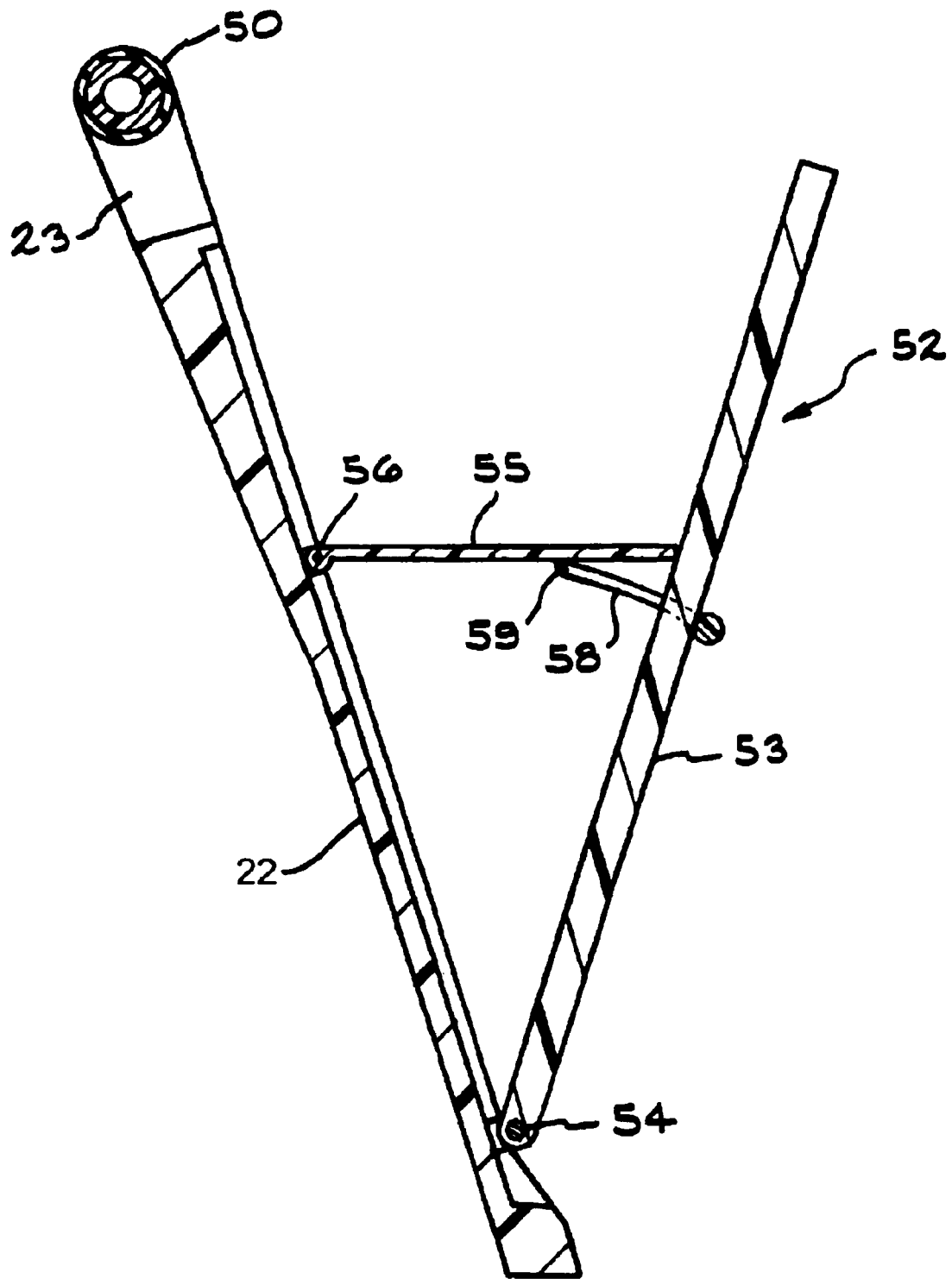
FIG. 7 illustrates how the folded child seat of FIGS. 5 and 6 can be opened for use.

As shown in FIGS. 5 and 6 protective wheel covers 43 are formed at the end of a pair of opposite rear cover arms 42 which cover the bars 15 extend downwardly, from the opposite resin sides 17 of the basket 11. The side reinforcing bars 15 are arranged to face outwardly, thus providing their smooth back side of the channel members 15 on the interior surface of the basket. Flat faced T-nuts are used to secure the basket sides 14 to the side bars 15. In this respect the T-nuts are arranged with their flat sides on the inside of the basket and their shafts extending through the channels to the exterior of the resin sides for receipt of bolt heads in threaded relation therewith. The bolt heads are tightened to the nuts within recesses formed in the exterior side of the basket side 17, as illustrated in greater detail in FIG. 4.

The metal frame—resin combination of the invention can be designed to slightly flex or twist to compensate for uneven floor surfaces. This additionally assists to reduce wheel wobble compared to other more rigid carts where one or more wheels do not completely make contact with the floor.

Turning to the details of construction of the back of the basket, FIGS. 5 and 6 illustrate how the back 22 of the basket 11 is supported from the handle 50. The handle spans the distance between the top rear space between the opposite sides 17 of the basket. The rear or back wall is supported by two spaced arms 23 having their top ends pivotally suspended from the handle 50. As shown in dotted lines in FIG. 6 the rear wall 22 can be swung to an upper limit to free the space at the rear of the basket for receipt of the front end of a following basket to be nested therein thus permitting stacking of the carts in a series lined relation.

As illustrated in FIG. 1, the basket back 22 has a resin child seat 52 mounted thereon formed by a seat front 53 pivotally mounted at its bottom 54 to the basket back 22. By this arrangement the seat 52 can be folded in compact relation up against the interior of the basket back to provide greater space in the basket for articles to be conveyed as desired. A horizontal seating member 55 of the child seat is mounted in pivoted relation at a pivot 56 on the basket back to permit it to be folded up against the basket back between the seat front 53 and the basket back 22 for compact storage when not in use.

The horizontal seat member 55 is limited to a horizontal position by an underlying limit member 58 having a pivot 59 under the member 55 and extending through a slot opening in the member 53. With the back 22 and the child seat thereon both pivoted from the handle 50, the child seat folds into less space than is possible with other cart arrangements, thus making more storage capacity available than carts of other construction.

Figure 8:
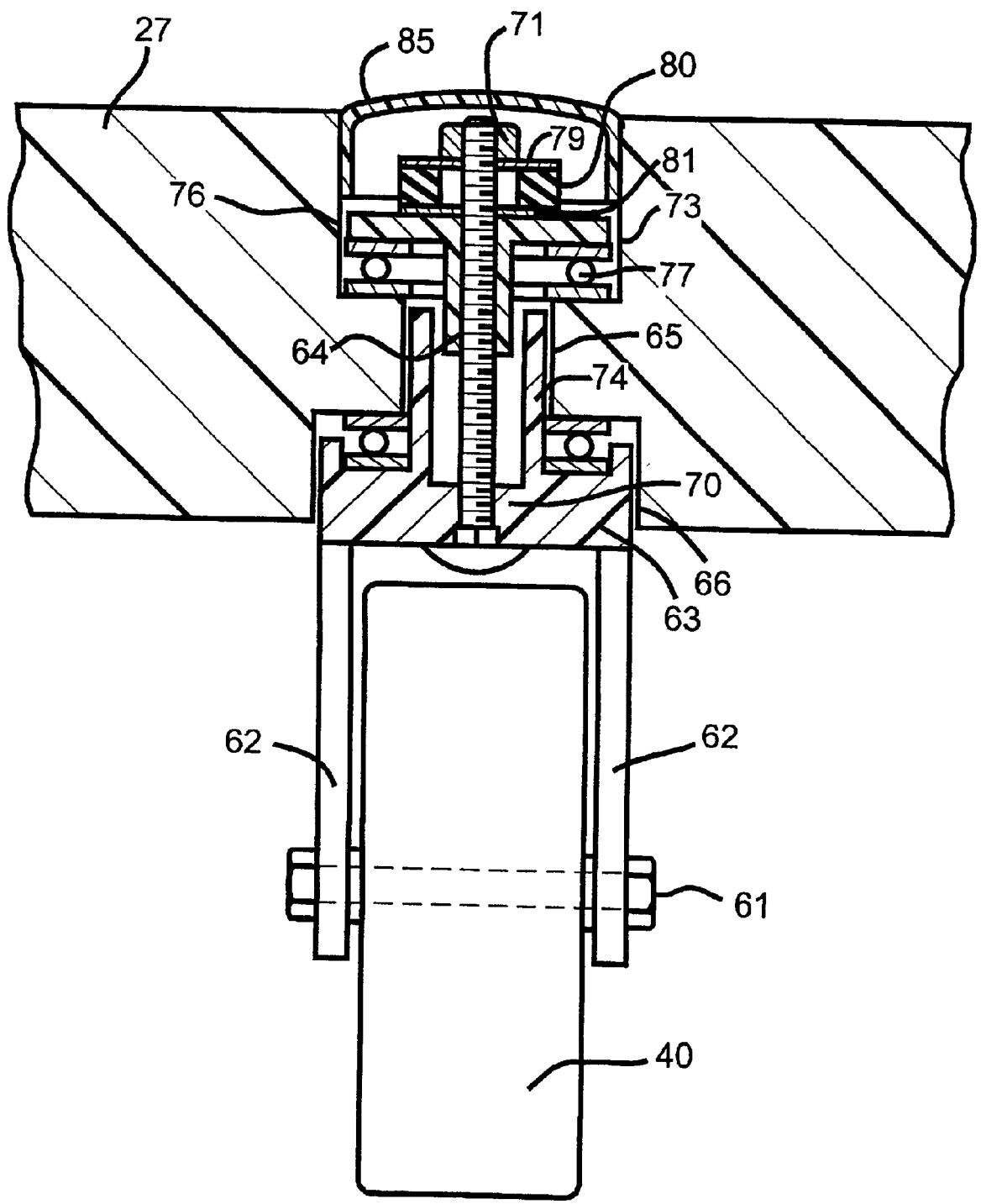
FIG. 8 is a partially sectional view of the front wheel assembly of FIG. 1.

FIG. 8 illustrates the unique manner in which each of the front castor wheels 40 is mounted to be self adjusting in the bumper block 27 to reduce tendencies toward wobble frequently experienced in the use of aging shopping carts. A tendency toward such wobble is reduced in the present arrangement by provision of a resilient spring washer 80 made of material such as neoprene or rubber located at the securing end of the mounting bolt 70 securing the complete assembly on the cart. As illustrated in FIG. 8, each wheel 40 is supported on an axle bolt 61 mounted in horizontally extended relation across a pair a parallel side arms 62 extending downwardly from a rotatable bearing retainer insert 63 of an overlying bearing assembly. The retainer 63 has a tubular extension 74 which extends upwardly into a circular opening 65 in the bumper block 27. The retainer 63 is mounted in a recess 66 in the under side of the bumper block 27 which also provides space for a mating lower ball bearing 67. An upper recess 76 in the top of the bumper block 27 provides space for an upper ball bearing 77 and a downwardly extending bearing retainer 73 having a projecting tubular extension 74 which telescopically projects downward into mated relation with the upwardly extending tubular extension 64 of the retainer 63. The carriage bolt 70 extends from the bottom retainer 63 through the mated tubular extensions 64 and 74 for securement at the upper surface thereof by a lock nut 71. Under the lock nut 71 and at the top of the retainer 73 is provided a combination of the spring washer 80 and a pair of metal retaining washers 79 and 81 on both sides thereof held in tight relation therewith by the nut 71 to hold the entire assembly resiliently secured relation in the upper block 27. A resin cap 85 is provided in overlying relation with the lock nut 71 and resilient washer assembly as well as in snap it relationship with the sides of the upper recess 76 of the bumper block 27.

It will be understood from the foregoing that many variations of the arrangement of my invention can be provided within the broad scope of the principles embodied herein. Thus, while a particular preferred embodiment has been shown and described it is intended by the appended claims to cover all such modification which fall within the true spirit and scope of the invention.

What is claimed is:

1. A shopping cart for carriage of merchandise selected for purchase in grocery markets and department stores comprising a wheeled carriage, a rectangular basket and an underlying support for said basket included on said carriage, said basket being made of resin and said support comprising a U-shaped metal channel member extending in bridging relationship across the width of said carriage in support of said basket a pair of U-shaped metal channel members extending from the rear of said carriage upwardly and forwardly from opposite sides of said carriage into said basket in merged reinforcing relation with the opposite interior surfaces of the side walls of said basket.

2. A shopping cart as claimed in claim 1 in which said upwardly extending channel members each have a bottom end projecting below said carriage, a pair of rear wheels of said carriage each mounted at a bottom end of a separate one of said upwardly extending members.

3. A shopping cart for carriage of merchandise selected for purchase in grocery markets, and department stores comprising a wheeled carriage, a basket and an underlying support for said basket on said carriage, said carriage comprising a pair of U-shaped metal side channel members on opposite sides of the carriage extending from the rear of the carriage to the front, said side channel members at their front end being secured to a resin bumper block, a separate upwardly extending basket reinforcing channel member each connected to one of said side channel members and extending into engagement with the interior of a side of said basket, each of said upwardly extending basket reinforcing channel members having a lower end projecting below the side channel member to which it is connected, a separate wheel mounted at the bottom end of each of said lower ends, an upper cross-brace member extending between said spaced upwardly extending basket reinforcing channel members which engages the rear edge of the bottom of said basket in supporting relation therewith, said underlying support comprising a channel member mounted in spanning relation between said side channel members in underlying communication with the bottom of said basket in a region forward of said upper cross brace member whereby said basket is supported in stable relation by said supporting channel member and said upper cross brace member in combination with said upwardly extending basket reinforcing channel members, a pair of spaced wheels swivelably mounted in the underside of said bumper block, each of said swivelably mounted wheels being mounted in said bumper block in a mounting assembly, said mounting assembly including a vertical swivel axle extending upwardly between said upper and lower bearings, said swivel axle including tightening means at its upper end securing said upper and lower bearings in assembled relation, a resilient washer provided in said tightening means above said upper bearing of said mounting assembly whereby tendency toward wobble of said wheel in its mounting assembly is minimized.

4. A shopping cart for carriage of customer selected merchandise comprising a wheeled carriage, a rectangular basket made of resin, an underlying support for said basket included on said carriage, said carriage comprising a pair of U-shaped metal side channel members spaced across the width of said carriage extending horizontally from the rear end to the front end of said carriage, said underlying support comprising a U-shaped metal channel member extending in bridging relationship under said basket across the width of said carriage in support of said basket, a pair of upwardly extending U-shaped metal side channel members each extending forwardly from the rear end of one of said side channel members into said basket in merged reinforcing relation with the interior surface of an overlying side wall of said basket.

5. A shopping cart as claimed in claim 4 in which each of said interior surface of the opposite sides of said basket is provided with a groove oriented and sized to receive in snug fit relation one of said upwardly extending metal channel members and securing means holding said upwardly extending metal channel member in securely fastened relation in said groove with the legs of said channel member facing the side in which it is secured.

6. A shopping cart as claimed in claim 5 in which said securing means comprises a series of T-nuts spaced along the length of said upwardly extending member,
   each of said T-nuts having a flat face positioned on the interior side of said basket to present a flush interior of said upwardly extending member with said basket interior.

7. A shopping cart as claimed in claim 4 in which a handle is provided at the rear upper edge of said basket extending directly between the two sides of the basket.

8. A shopping cart as claimed in claim 7 in which the back of the basket is pivotally supported directly from said handle by spaced hanging members.

9. A shopping cart as claimed in claim 8 including child seat pivotally supported in foldable relation on said back.

10. A shopping cart as claimed in claim 9 in which said side channel members at their front ends are secured to opposite sides of a bumper block.

11. A shopping cart as claimed in claim 10 in which a pair of spaced wheels are each swivably mounted with resilient means to reduce tendencies toward wobble of the wheels.

* * * * *